(12) United States Patent
Yoshikawa et al.

(10) Patent No.: US 7,042,671 B2
(45) Date of Patent: May 9, 2006

(54) DISK APPARATUS AND ACTUATOR HOLDING METHOD

(75) Inventors: Norio Yoshikawa, Yokohama (JP); Tomoyuki Tokizaki, Ome (JP)

(73) Assignee: Kabbushiki Kaisha Toshiba, Tokyo (JP)

( * ) Notice: Subject to any disclaimer, the term of this patent is extended or adjusted under 35 U.S.C. 154(b) by 36 days.

(21) Appl. No.: 10/740,529

(22) Filed: Dec. 22, 2003

(65) Prior Publication Data

US 2004/0130826 A1 Jul. 8, 2004

(30) Foreign Application Priority Data

Dec. 24, 2002 (JP) .............................. 2002-372378

(51) Int. Cl.
*G11B 21/02* (2006.01)
(52) U.S. Cl. ...................................... 360/75; 360/78.04
(58) Field of Classification Search .................. 360/75, 360/78.01, 78.04, 256.2, 256.3, 264.9
See application file for complete search history.

(56) References Cited

U.S. PATENT DOCUMENTS

| | | | |
|---|---|---|---|
| 5,581,424 A | | 12/1996 | Dunfield et al. |
| 5,768,063 A | * | 6/1998 | Suwa et al. ............... 360/256.2 |
| 6,252,744 B1 | * | 6/2001 | Kelemen ................. 360/256.2 |

| | | | |
|---|---|---|---|
| 2002/0060886 A1 | | 5/2002 | Bae et al. |

FOREIGN PATENT DOCUMENTS

| | | |
|---|---|---|
| JP | 7-176152 | 7/1995 |
| JP | 11-096699 A | 4/1999 |

OTHER PUBLICATIONS

Austrian Search Report and Written Opinion dated Jul. 30, 2004, for Austrian Patent Application No. 200307638-7.
Japanese Office Action dated Mar. 22, 2005 for Appln. No. 2002-372378.

* cited by examiner

*Primary Examiner*—David Hudspeth
*Assistant Examiner*—Jason Olson
(74) *Attorney, Agent, or Firm*—Pillsbury Winthrop Shaw Pittman LLP (57) ABSTRACT

A magnetic disk apparatus comprises an actuator for swinging a magnetic head substantially in the radial direction of a magnetic disk. First and second magnetic bodies, which individually constitute magnetic circuits between the magnetic bodies and a permanent magnet of a VCM, are fixed to the rear end of the actuator. The first magnetic body is pulled by leakage flux from the permanent magnet to return the actuator to a parking position when the actuator is deviated from the parking position. The second magnetic body is caused by the leakage flux to act so as to return the actuator at least to a position in a range such that a tensile force acts on the first magnetic body when the actuator is moved overpassing that range.

6 Claims, 5 Drawing Sheets

DISK APPARATUS AND ACTUATOR HOLDING METHOD

CROSS-REFERENCE TO RELATED APPLICATIONS

This application is based upon and claims the benefit of priority from the prior Japanese Patent Application No. 2002-372378, filed Dec. 24, 2002, the entire contents of which are incorporated herein by reference.

BACKGROUND OF THE INVENTION

1. Field of the Invention

The present invention relates to a disk apparatus for recording in and/or reproducing information from a rotating disk-shaped medium and an actuator holding method for holding an actuator, which has a recording and/or reproducing head mounted on its distal end, in a parking position.

2. Description of the Related Art

Conventionally known is a magnetic disk apparatus that comprises a spindle motor for rotating a magnetic disk and a voice coil motor (see Jpn. Pat. Appln. KOKAI Publication No. 7-176152, for example). The voice coil motor swings an actuator, which has a magnetic head mounted on its distal end, thereby moving the magnetic head substantially in the radial direction of the disk.

In operating the magnetic disk apparatus, the magnetic disk is rotated by means of the spindle motor, and the actuator is swung by means of the voice coil motor. Thereupon, the magnetic head on the distal end of the actuator is moved substantially in the radial direction of the disk, and the head is opposed to a desired track of the disk. In this state, information is recorded on and/or retrieved from the track.

The magnetic disk apparatus is provided with a retracting and locking mechanism that retracts and locks the actuator to the inner periphery of the disk when not in operation. By locking the actuator to the inner periphery of the disk by means of the retracting and locking mechanism, the magnetic head can be prevented from unexpectedly moving to an effective region of the magnetic disk and from touching the disk when the actuator is not operating.

The retracting and locking mechanism includes a movable permanent magnet fixed integrally to the rear end portion of the actuator and lower and upper fixed yokes that vertically hold the permanent magnet between them. The permanent magnet and the lower and upper yokes constitute a magnetic circuit for urging the actuator toward the inner periphery of the disk. As the actuator rotates, the movable permanent magnet moves along a gap between the lower and upper fixed yokes.

The gap between the lower and upper fixed yokes is gradually narrowed toward a lock position for the actuator so that a maximum magnetic force acts on the movable permanent magnet in the lock position. Thus, the actuator can be securely locked in the lock position.

In operating the actuator, however, it must be unlocked. Therefore, the magnetic retention of the actuator in the lock position must be set to a value lower than a specific magnetic force such that the actuator can be unlocked. If the retention exceeds this specific force, the actuator cannot move from the lock position.

Thus, if an undesired vibration is applied to the actuator in a nonoperating state from outside the magnetic disk apparatus, the aforesaid retracting and locking mechanism inevitably allows the actuator to move easily from the lock position.

Further, the retracting and locking mechanism of this type includes the lower and upper fixed yokes that are long enough to cover the whole movement region of the movable permanent magnet (i.e., whole swinging range of the actuator). When information is recorded or reproduced by means of the magnetic head on the distal end of the actuator, therefore, a retractive force that is directed to the inner periphery of the disk continually acts on the actuator. Accordingly, this conventional mechanism has a problem that the continually acting retractive force exerts a bad influence upon the seeking operation of the magnetic head, and therefore, upon information recording and/or reproducing operation.

BRIEF SUMMARY OF THE INVENTION

An embodiment of the present invention has been contrived in consideration of these circumstances, and its object is to provide a disk apparatus and an actuator holding method, capable of holding a nonoperating actuator securely and steadily in a parking position without exerting a bad influence upon information recording and/or reproducing operation.

In order to achieve the above feature, a disk apparatus according to an aspect of the invention comprises: a spindle motor which rotates a disk; an actuator mounted, on the swinging distal end thereof, with a head which records in and/or reproduces information from the disk; a voice coil motor which swings the actuator to move the head substantially in the radial direction of the disk; a holding mechanism which holds the actuator in a parking position in which the head is off an effective region of the disk; a first magnetic circuit which generates a first magnetic force which acts so as to return the actuator to the parking position when the actuator is deviated from the parking position; and a second magnetic circuit which generates a second magnetic force which acts so as to return the actuator at least to a position in a range such that the actuator can be returned to the parking position by means of the first magnetic force when the actuator leaves the parking position overpassing the range for the return.

According to an embodiment of the present invention described above, the actuator having the head thereon can be returned to the parking position by means of the first magnetic force if the actuator held in the parking position is unexpectedly deviated from the parking position by external force, for example. If the actuator is moved overpassing a range such that it can be returned to the parking position by means of the first magnetic force, it can be returned at least to a position in that range by means of the second magnetic force. If the actuator is moved to a position in a range such that it cannot be returned to the parking position by means of the first magnetic force, therefore, it can be returned by means of the second magnetic force to a position in the range of action of the first magnetic force. Thus, the range in which the magnetic force for returning the actuator to the parking position acts can be lengthened. By suitably setting the range of action of the second magnetic force, moreover, an appropriate magnetic force can be applied to the actuator before the head reaches the effective region of the disk, and the information recording and/or reproducing operation can be prevented from being adversely affected.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will now be described with reference to the accompanying drawings.

Figure 1:
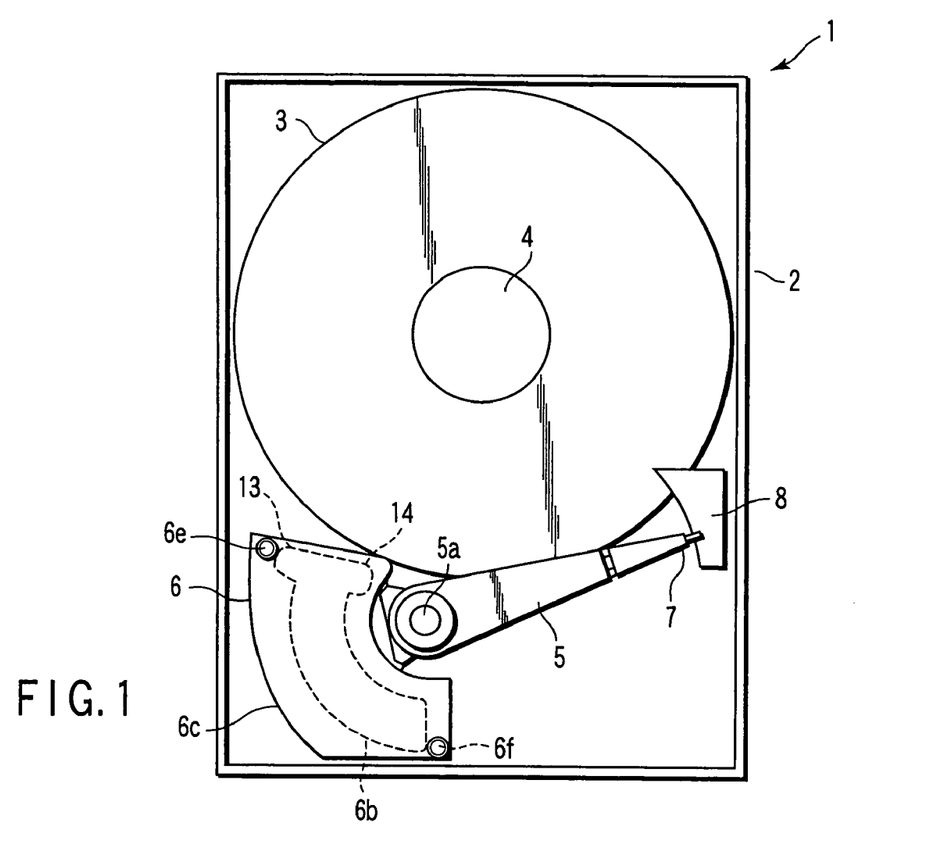
FIG. 1 is a schematic view showing a magnetic disk apparatus according to an embodiment of the invention.
Figure 2:
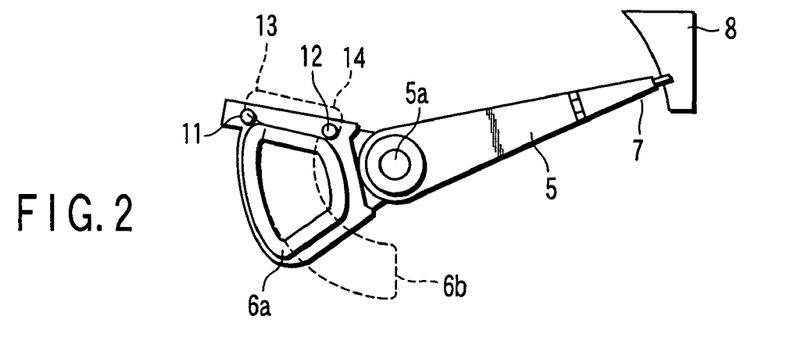
FIG. 2 is a schematic view showing an actuator incorporated in the magnetic disk apparatus of FIG. 1.

FIG. 1 is a schematic view of a magnetic disk apparatus (disk apparatus) 1 according to the embodiment of the invention. FIG. 2 is a schematic view of an actuator 5 incorporated in the magnetic disk apparatus 1.

As shown in FIG. 1, the magnetic disk apparatus 1 has a case 2 in the form of a substantially rectangular box. In order to expose the internal structure of the magnetic disk apparatus 1, its top cover (not shown) is removed.

A spindle motor 4 that supports and rotates a magnetic disk 3 is located substantially in the center of a case 2. A voice coil motor 6 (hereinafter referred to as VCM 6) for swinging the actuator 5 is disposed outside the magnetic disk 3 in the case 2.

Figure 8:
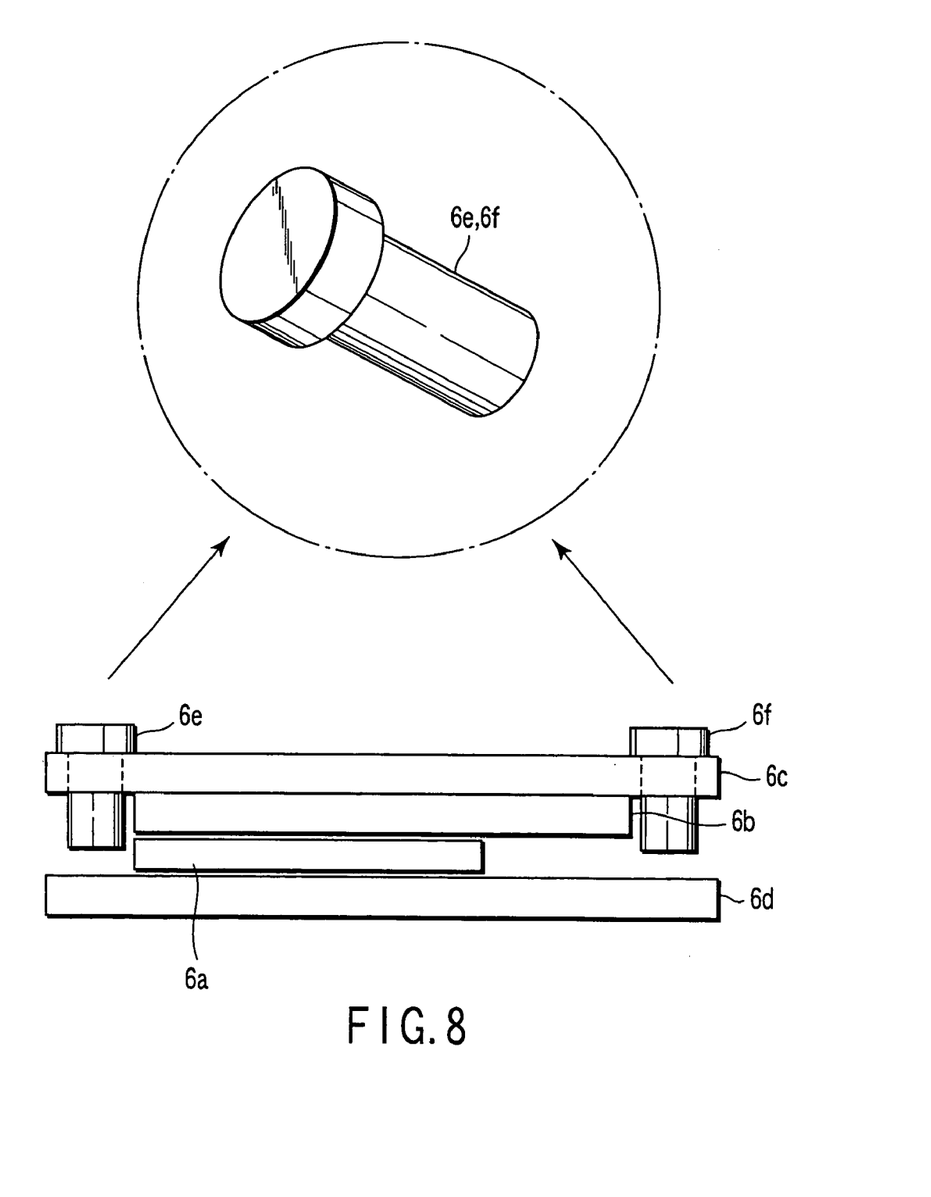
FIG. 8 is a schematic view showing the elevation of a VCM incorporated in the magnetic disk apparatus of FIG. 1.

The VCM 6 has a molded coil 6a (see FIG. 2) on the rear end of the actuator 5, a substantially fan-shaped permanent magnet 6b for applying magnetic flux to the coil 6a, a first yoke 6c fitted with the permanent magnet 6b, and a second yoke 6d (see FIG. 8). The permanent magnet 6b and the second yoke 6d are opposed to each other with the coil 6a between them. When the coil 6a that crosses the magnetic flux of the permanent magnet 6b is energized, the actuator 5 can be swung around a rotating shaft 5a. First and second stoppers 6e and 6f are attached individually to holes in the first yoke 6c, and serve to limit the movable range of the coil 6a.

A magnetic head 7 is mounted on the swinging distal end of the actuator 5. It is used to record in and/or reproduce information from the magnetic disk 3. When the actuator 5 is not operating, its distal end is held and bound outside the magnetic disk 3 by frictional force between the actuator 5 and a ramp 8 that is situated off the disk 3 and supports a tip of the actuator 5. When the actuator 5 is nonoperating, in other words, the magnetic head 7 is evacuated from an effective region for disk recording and reproduction, and the actuator 5 is held in a parking position. The parking position is a position where a member for molding the coil 6a is in contact with the first stopper 6e.

Thus, the ramp 8 holds the actuator 5 in the parking position by means of the frictional force between itself and the actuator 5. If external force that is great enough to resist the frictional force is applied to the case 2, for example, therefore, the actuator 5 is disengaged from the ramp 8 and moves unexpectedly from the parking position. In this case, the magnetic disk 3 is not rotating. If the magnetic head 7 faces the effective region of the magnetic disk 3, therefore, they touch each other so that both or one of them may be damaged.

Thus, if the case 2 is undesirably vibrated to move the nonoperating actuator 5 away from the parking position, a mechanism is needed to return the actuator 5 automatically to the parking position.

In the present embodiment, as shown in FIG. 2, the return mechanism for the actuator 5 includes first and second magnetic bodies 11 and 12. The magnetic bodies 11 and 12 are fixed to the rear end of the actuator 5 by molding and spaced in the direction of the radius of swing of the actuator 5.

More specifically, the first magnetic body 11 is situated opposite the rear end of the substantially fan-shaped permanent magnet 6b of the VCM 6 in its radial direction (width direction). The second magnetic body 12 is situated opposite the width-direction front end of the permanent magnet 6b. In other words, the permanent magnet 6b is located between the first and second magnetic bodies 11 and 12.

Further, the radially opposite end portions of the permanent magnet 6b are shaped individually corresponding to the first and second magnetic bodies 11 and 12 and form two protuberances 13 and 14, individually. The first magnetic body 11 and the protuberance 13 constitute a first magnetic circuit of the invention, while the second magnetic body 12 and the protuberance 14 constitute a second magnetic circuit of the invention. In other words, the first and second magnetic bodies 11 and 12 and the two protuberances 13 and 14 are positioned so that the first and second magnetic circuits behave in the following manner.

Figure 3A:
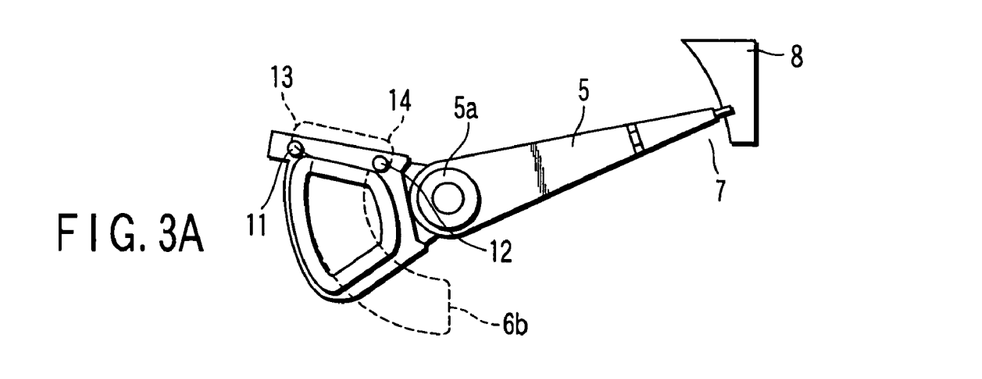
FIGS. 3A to 3C are views illustrating the operation of first and second magnetic circuits for returning the actuator of FIG. 2 to a parking position.
Figure 3B:
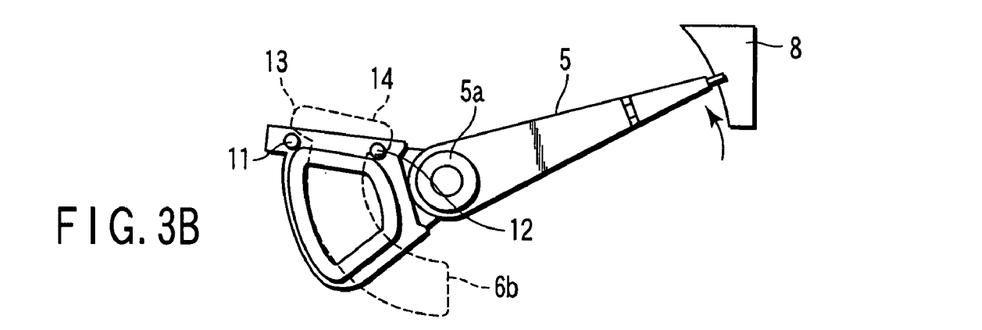
Figure 3C:
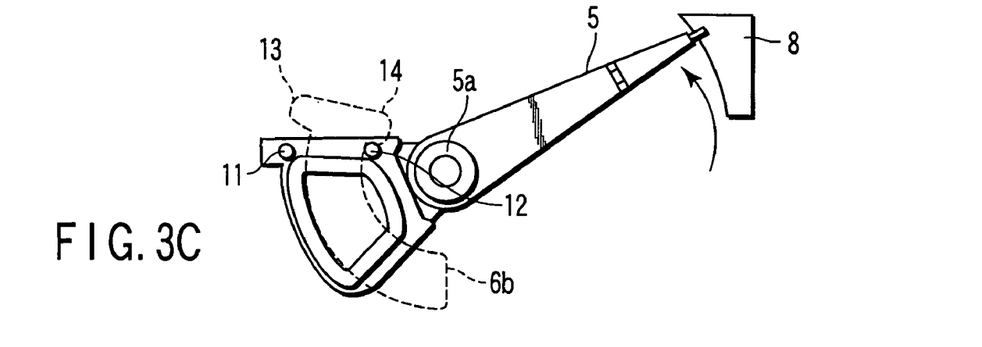
Figure 4:
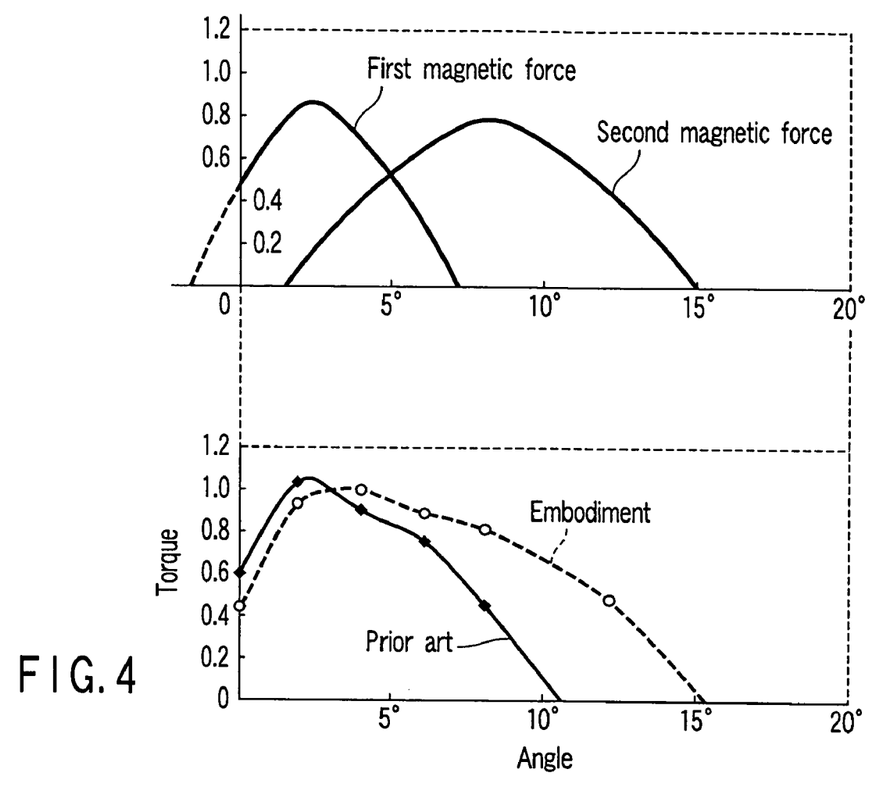
FIG. 4 is a graph showing relations between torques the first and second magnetic circuits apply to the actuator and the angle of movement of the actuator.

The functions of the first and second magnetic circuits will now be described with reference to FIGS. 3A to 3C and FIG. 4. FIGS. 3A to 3C show the relative positions of the first and second magnetic bodies 11 and 12 and the two protuberances 13 and 14 of the permanent magnet 6b, which depend on the position of swing of the actuator 5. FIG. 4 is a graph showing the change of torque that the first and second magnetic circuits apply to the actuator 5, depending on the position of swing of the actuator 5. The actuator 5 is continually urged toward the parking position by the first and second magnetic circuits.

When the actuator 5 is held in the parking position by the ramp 8, the swing angle of the actuator 5 is 0°, and only a first magnetic force that is generated by the first magnetic circuit acts on the actuator 5. FIG. 3A shows the relative positions of the first and second magnetic bodies 11 and 12 and the two protuberances 13 and 14 of the permanent magnet 6b.

In this state, the first magnetic body 11 is situated near the boundary of the protuberance 13 and is attracted by leakage flux from the protuberance 13, whereby the actuator 5 is bound and held in the parking position. On the other hand, the second magnetic body 12 is situated not near the boundary of its corresponding protuberance 14 but substantially right under the protuberance 14. Thus, there is hardly any vector component of a second magnetic force that affects the second magnetic body 12 in the swinging direction of the actuator 5.

If external force is applied to the case 2 in this state, for example, the actuator 5 is slightly rocked away from the parking position, as shown in FIG. 3B. Thereupon, the actuator 5 is returned to the parking position by the first magnetic force of the first magnetic circuit. More specifically, if the actuator 5 swings from the parking position, the first magnetic body 11 that is situated on the boundary of the protuberance 13 moves away from the protuberance 13 (or in the counterclockwise direction of FIG. 3B). However, the first magnetic body 11 is pulled in the direction (clockwise direction in FIG. 3B) reverse to the swinging direction by the leakage flux from the protuberance 13, so that the actuator 5 is returned to the parking position.

If the actuator 5 leaves the parking position overpassing a range such that it can be returned to the parking position by means of the first magnetic force, as shown in FIG. 3C, on the other hand, the second magnetic force that is generated by the second magnetic circuit then acts on the actuator 5.

Thus, in the state shown in FIG. 3C, the second magnetic body 12, having moved counterclockwise from under its corresponding protuberance 14, is situated near the boundary of the protuberance 14. If the actuator 5 is swung to the state shown in FIG. 3C, therefore, the actuator 5 is urged toward the parking position by means of the second magnetic force. In consequence, the actuator 5 is returned to an angular range (state of FIG. 3B) such that it can be returned to the parking position by means of the first magnetic force at the least.

According to the present embodiment, as described above, the first and second magnetic forces are applied to the actuator 5 at different points of time depending on the position of swing (i.e., swing angle) of the actuator, as shown in FIG. 4. Thus, the actuator 5 can be returned to the parking position by means of a magnetic force having a torque curve that combines the first and second magnetic forces.

According to the torque curve of the present embodiment shown in FIG. 4, the angular range in which the actuator 5 can be returned to the parking position can be made wider than in the conventional case without failing to restrain the peak of torque. In FIG. 4, a prior art example is represented by a torque curve for the case where only the first magnetic body is attached to the rear end of the actuator 5.

If the peak of torque is restrained, the actuator 5 in operation can be moved from the parking position with a minimum necessary force. If the angular range in which the torque acts on the actuator 5 is widened, moreover, the actuator 5 can be returned securely and steadily to the parking position even though it is moved far from the parking position. In the present embodiment, the swing angle with which the actuator 5 can be returned to the parking position can be widened to about 12° to 13°. The range of this swing angle is an angular range covered just before the magnetic head 7 mounted on the distal end of the actuator 5 reaches the effective region of the magnetic disk 3. Therefore, the first and second magnetic forces that are generated by the first and second magnetic circuits never act on the actuator 5 when the magnetic head 7 faces the effective region. Thus, torque that is used to return the actuator 5 to the parking position never exerts a bad influence upon the information recording and/or reproducing operation by means of the magnetic head 7.

The present invention is not limited to the embodiment described above, and various changes and modifications may be effected therein without departing from the scope or spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

Figure 5:
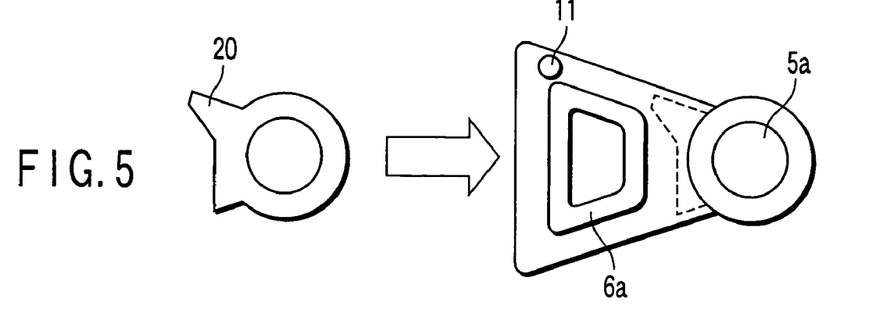
FIG. 5 is a view illustrating an example in which the magnetic material of the actuator is used also as a second magnetic body that constitutes the second magnetic circuit.

In the foregoing embodiment, for example, the two magnetic bodies 11 and 12 are molded on the rear end of the actuator 5. Alternatively, however, at least one magnetic body (second magnetic body 12 in this case) may be formed by shaping the magnetic material that constitutes the actuator 5, as shown in FIG. 5. In this example, a lug 20 that functions as the second magnetic body 12 is formed by shaping a pedestal for molding the coil 6a of the VCM 6.

In the embodiment described above, moreover, the first magnetic body 11 that constitutes the first magnetic circuit in conjunction with the permanent magnet 6b is located near the rear end of the actuator 5, while the second magnetic body 12 that constitutes the second magnetic circuit is located near the rotating shaft 5a with the permanent magnet 6b between them. However, it is necessary only that the first magnetic force generated by the first magnetic circuit and the second magnetic force generated by the second magnetic circuit be applied at the aforesaid different points of time depending on the swing angle of the actuator 5. For example, the first and second magnetic bodies 11 and 12 may be located in the positions shown in FIGS. 6A and 6B.

Figure 6A:
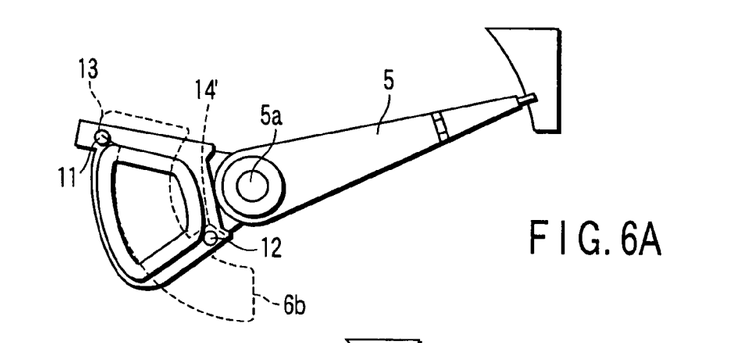
FIGS. 6A and 6B are views showing modifications in which the second magnetic body is located in different positions.

In the position shown in FIG. 6A, the second magnetic body 12 faces the radially inside end portion of the permanent magnet 6b and is shifted in the swinging direction of the actuator 5. If the second magnetic body 12 is located in the position shown in FIG. 6A, for example, the corresponding inside end portion of the permanent magnet 6b is shaped to form a protuberance 14'. In this case, the distances of movement covered by the first and second magnetic bodies 11 and 12 can be differentiated with respect to the swing angle of the actuator 5. Thus, the degree of freedom of the design of the two magnetic circuits can be enhanced.

In the foregoing embodiment, furthermore, the first magnetic body 11 that constitutes the first magnetic circuit is located on the outside in the radial direction, while the second magnetic body 12 that constitutes the second magnetic circuit is located on the inside. By doing this, the torque curve of the second magnetic circuit is made gentler than that of the first magnetic circuit, as shown in FIG. 4. Thus, the extent of the torque curve can be varied by changing the radial positions for the magnetic bodies.

Further, the number of magnetic bodies for returning the actuator 5 to the parking position and their respective sizes, shapes, positions, etc. and the number of protuberances formed on the permanent magnet 6b, corresponding to the magnetic bodies, and their respective sizes, shapes, positions, etc. may be changed as required. In short, it is necessary only that the peak of the torque for returning the actuator 5 to the parking position be restricted to a fixed level and that the angular range for the torque be widened.

Figures 6B, 7:
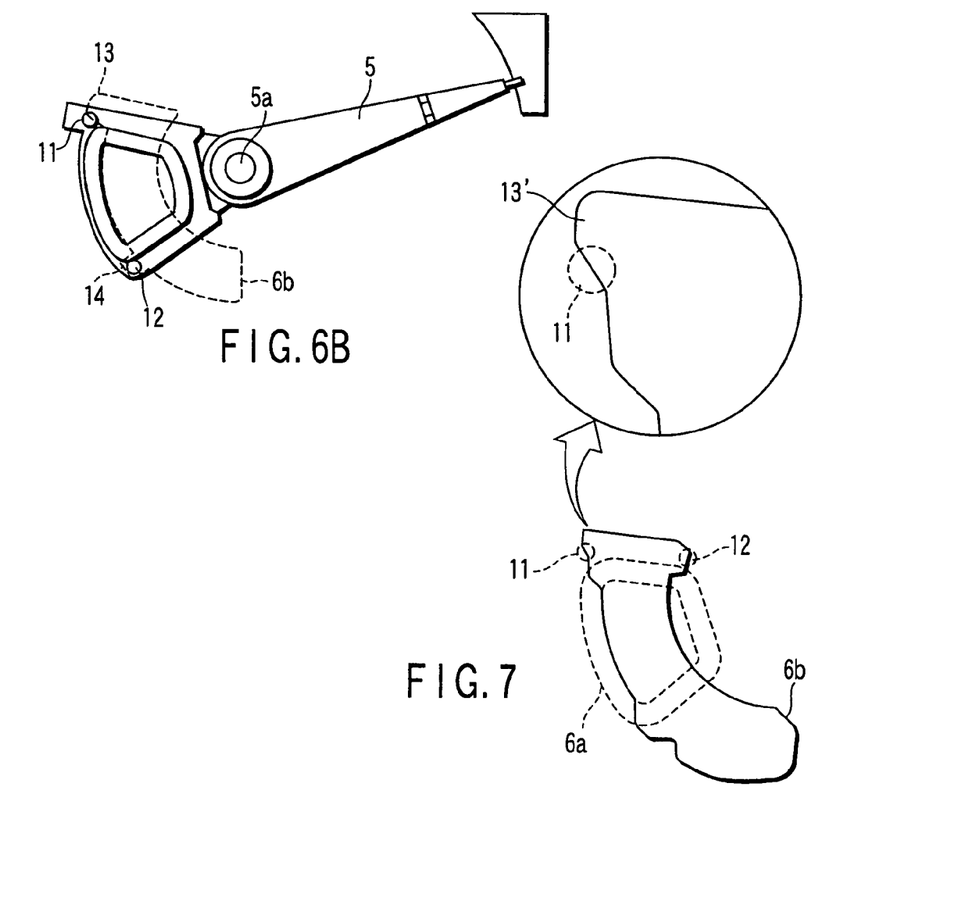
FIG. 7 is a view showing an example in which the boundary of a permanent magnet to which a first magnetic body is opposed is shaped.

For example, a protuberance 13' corresponding to the first magnetic body 11 may be shaped in the manner shown in FIG. 7. In this case, the boundary of the protuberance 13' that faces the first magnetic body 11 is inclined at an angle to the moving direction of the magnetic body 11, so that the torque that acts on the magnetic body 11 can be increased as the parking position is approached. Thus, the shape of the torque curve of the magnetic circuit can be modified by changing the shape of the boundary of the magnet that applies the magnetic flux to the magnetic body.

In the embodiment described above, moreover, the magnetic circuits are formed by utilizing the leakage flux from the permanent magnet 6b of the VCM 6. Alternatively, however, a magnet that forms a magnetic circuit between itself and a magnetic body may be provided independently of the permanent magnet 6b of the VCM 6. In place of the first and second magnetic bodies 11 and 12, furthermore, a permanent magnet may be fixed to the actuator 5. In this case, the case 2 of the magnetic disk apparatus 1 or the like is provided with a magnetic body that acts on the permanent magnet.

What is claimed is:

1. A disk apparatus comprising:
   a spindle motor which rotates a disk;
   an actuator, including a swinging distal end and a head that records in, and/or reproduces information from, the disk;
   a voice coil motor which swings the actuator to move the head along a substantially radial direction of the disk;
   a first magnetic circuit that generates a first magnetic force which acts to return the actuator to a parking position in which the head is off an effective region of the disk when the actuator is deviated from the parking position; and
   a second magnetic circuit that generates a second magnetic force which acts to return the actuator to a position in a range such that the actuator can be returned to the parking position via the first magnetic force when the actuator leaves the parking position and overpasses the range for the return,
   wherein the first and second magnetic forces are applied to the actuator at different swing positions of the actuator, and
   wherein the first and second magnetic bodies are spaced in the direction of the radius of swing of the actuator.

2. A disk apparatus according to claim 1, wherein the first and second magnetic bodies are spaced slightly overreaching the width of the magnet in the radial direction and are located in positions opposite the width-direction end portions of the magnet.

3. A disk apparatus according to claim 2, wherein the width-direction end portions of the magnet are shaped so that given magnetic forces act on the first and second magnetic bodies, individually, depending on the position of swing of the actuator.

4. An actuator holding method, comprising:
   holding an actuator, which includes a swinging distal end and a head which records in and/or reproduces information from a rotating disk, in a parking position in which the head is off an effective region of the disk when the actuator is not operating;
   applying a first magnetic force so as to return the actuator to the parking position when the actuator held in the parking position is deviated from the parking position; and
   applying a second magnetic force so as to return the actuator to a position in a range such that the actuator can be returned to the parking position via the first magnetic force when the actuator leaves the parking position overpassing the range for the return,
   wherein the first and second magnetic forces are applied to the actuator at different swing positions of the actuator, and
   wherein applying the first magnetic force and applying the second magnetic force include applying leakage flux from a magnet of a voice coil motor, which swings the actuator, to first and second magnetic bodies, which are fixed to the rear end of the actuator in a spaced manner, at different points of time depending on the position of swing of the actuator, thereby returning the actuator to the parking position.

5. A disk apparatus comprising:
   a spindle motor which rotates a disk;
   an actuator, including a swinging distal end and a head which records in and/or reproduces information from the disk;
   a voice coil motor which swings the actuator to move the head substantially in the radial direction of the disk;
   a first magnetic circuit which generates a first magnetic force which acts to return the actuator to a parking position in which the head is off an effective region of the disk when the actuator is deviated from the parking position; and
   a second magnetic circuit which generates a second magnetic force which acts to return the actuator to a position in a range such that the actuator can be returned to the parking position via the first magnetic force when the actuator leaves the parking position overpassing the range for the return,
   wherein the first and second magnetic forces are applied to the actuator at different swing positions of the actuator, and
   wherein one of the first and second magnetic circuits is magnetically independent from the voice coil motor.

6. A disk apparatus comprising:
   a spindle motor which rotates a disk;
   an actuator, including a swinging distal end and a head which records in and/or reproduces information from the disk;
   a voice coil motor which swings the actuator to move the head substantially in the radial direction of the disk;
   a first magnetic circuit which generates a first magnetic force which acts to return the actuator to a parking position in which the head is off an effective region of the disk when the actuator is deviated from the parking position; and
   a second magnetic circuit which generates a second magnetic force which acts to return the actuator to a position in a range such that the actuator can be returned to the parking position via the first magnetic force when the actuator leaves the parking position overpassing the range for the return,
   wherein the first and second magnetic forces are applied to the actuator at different swing positions of the actuator, and
   wherein said first and said second magnetic circuits are each configured to unidirectionally swing the actuator.

* * * * *

UNITED STATES PATENT AND TRADEMARK OFFICE
CERTIFICATE OF CORRECTION

PATENT NO. : 7,042,671 B2  Page 1 of 1
APPLICATION NO. : 10/740529
DATED : May 9, 2006
INVENTOR(S) : Norio Yoshikawa et al.

It is certified that error appears in the above-identified patent and that said Letters Patent is hereby corrected as shown below:

On title page, item 73 Assignee
  replace "Kabbushiki Kaisha Toshiba"
  with --KABUSHIKI KAISHA TOSHIBA--.

Signed and Sealed this

First Day of August, 2006

JON W. DUDAS
*Director of the United States Patent and Trademark Office*